(12) United States Patent
Yang et al.

(10) Patent No.: US 7,684,118 B2
(45) Date of Patent: Mar. 23, 2010

(54) DIFFUSION PLATE AND DIFFUSION PLATE ASSEMBLY

(75) Inventors: Tzu-Jang Yang, Taoyuan County (TW); Wen-Feng Cheng, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 0 days.

(21) Appl. No.: 11/942,004

(22) Filed: Nov. 19, 2007

(65) Prior Publication Data
US 2009/0128913 A1     May 21, 2009

(51) Int. Cl.
*G02B 5/02* (2006.01)
(52) U.S. Cl. .................. 359/599; 359/613; 362/626
(58) Field of Classification Search ......... 359/452–455, 359/599, 707, 831–837
See application file for complete search history.

(56) References Cited

U.S. PATENT DOCUMENTS

| | | | | |
|---|---|---|---|---|
| 4,730,897 A * | 3/1988 | McKechnie et al. | ......... | 359/452 |
| 5,457,572 A * | 10/1995 | Ishii et al. | .................... | 359/457 |
| 5,779,338 A | 7/1998 | Ishikawa et al. | | |
| 6,046,846 A * | 4/2000 | van de Ven | ................. | 359/455 |
| 6,075,649 A * | 6/2000 | Naito | ......................... | 359/619 |
| 6,700,716 B2 * | 3/2004 | Sejkora | ....................... | 359/834 |
| 6,963,451 B2 | 11/2005 | Se et al. | | |
| 2003/0214720 A1 * | 11/2003 | Bourdelais et al. | .......... | 359/599 |
| 2005/0195487 A1 | 9/2005 | Yu et al. | | |
| 2005/0224997 A1 | 10/2005 | Liao et al. | | |
| 2005/0270654 A1 * | 12/2005 | Goto et al. | ................... | 359/626 |
| 2006/0176429 A1 | 8/2006 | Watchi et al. | | |
| 2006/0176642 A1 | 8/2006 | George et al. | | |
| 2006/0238874 A1 * | 10/2006 | Yao et al. | ..................... | 359/619 |
| 2007/0014034 A1 | 1/2007 | Lee et al. | | |
| 2008/0062525 A1 * | 3/2008 | Cheng | ......................... | 359/599 |

* cited by examiner

*Primary Examiner*—Thong Nguyen
(74) *Attorney, Agent, or Firm*—Alan Kamrath; Kamrath & Associates PA

(57) ABSTRACT

A diffusion plate assembly includes a diffusion plate made from transparent material. Pluralities of bar-type patterns are disposed on the emission surface of the diffusion plate. The outline of these patterns has a first curve and a second curve. The protruding direction of the first curve and the second curve are inversed. The second curve is an arc whose radius curvature is between 0.05 mm and 0.3 mm.

14 Claims, 7 Drawing Sheets

DIFFUSION PLATE AND DIFFUSION PLATE ASSEMBLY

BACKGROUND OF THE INVENTION

1. Field of the Invention

The present invention relates to a diffusion plate and a diffusion plate assembly and particularly to a diffusion plate that has a plurality of bar-type patterns on an emission surface and a diffusion plate assembly including the diffusion plate.

2. Description of the Prior Art

In recent years, the traditional cathode ray tube display (commonly called CRT display) has been gradually replaced by a liquid crystal display (LCD). The main reason is that the LCD releases far less radiation than the CRT display. Moreover, the production cost of the LCD dropped significantly in the recent years. In general, the LCD includes a backlight module and a liquid crystal panel. The backlight module mainly aims to provide a light source for the LCD.

The backlight module generally includes a diffusion plate which contains multiple light diffusion particles made from a transparent polymer to diffuse light generated by cold cathode fluorescent lamps (CCFLs) to reduce impact on display quality resulting from illumination shade generated by the CCFLs. Without the diffusion plate, the display surface will have visible bright and dark strips. In the earlier time, the diffusion plate is a plane structure. As technology advances, the diffusion plate with patterns formed on the emission surface has been developed to further improve the display quality.

Refer to FIG. 1 for a conventional diffusion plate 100 which has a plurality of patterns 120 formed on an emission surface 110. When light 10 passes through the patterns 120, its travel direction changes, hence, reducing impact on display quality caused by the illumination shade generated by the CCFLs. The patterns 120 usually are formed in are shapes protruding outwards. Hence, light passing through the patterns 120 converges first at a focal point 120P before diffusing. As a result, its diffusion effect is not desirable.

How to make the diffusion plate to fully generate desired diffusion effect is an issue remained to be resolved in the industry.

SUMMARY OF THE INVENTION

It is an object of the present invention to provide a diffusion plate and a diffusion plate assembly to improve luminous uniformity and display quality.

The diffusion plate according to the invention is made from transparent material and has an emission surface formed with a plurality of bar-type patterns. The patterns have a first curve and a second curve that protrude in opposite directions. The second curve is an arc formed at a radius curvature between 0.05 mm and 0.3 mm.

In one aspect, the patterns of the diffusion plate are formed at a vertical length less than ½ of the width. In one embodiment of the invention, the ratio of the vertical length and width is 1:2.4.

In another aspect, the patterns protrude outwards, but also may be indented inwards, to become concave troughs.

In yet another aspect, the diffusion plate may be made from materials selected from the group consisting of Polymethyl Methacrylate (PMMA), Polycarbonate (PC), Polystyrene (PS), Methyl Methacrylate Styrene (MS), Polypropene (PP), Polythylene (PE), and Polythylene terephthalate (PET).

In yet another aspect, the second curve has a radius curvature of 0.1 mm.

In yet another aspect, the diffusion plate of the invention is mainly made from a transparent polymer material with an emission surface formed with a plurality of bar-type patterns. The patterns have a first curve and a triangle that protrude in opposite directions. The triangle has a vertex angle between 90 and 120 degrees.

In yet another aspect, the invention also provides a diffusion plate assembly which includes a first diffusion plate and a second diffusion plate. The first diffusion plate is located above the second diffusion plate and has an emission surface formed with a first pattern consisting of a plurality of bars. The first pattern has a first curve and a second curve that protrude in opposite directions. The second curve is an arc formed at a radius curvature between 0.05 mm and 0.3 mm. The second diffusion plate has a light incident surface formed with a plurality of second patterns.

In one aspect, the first pattern of the diffusion plate assembly is formed at a vertical length less than ½ of the width.

In another aspect, the second pattern of the diffusion plate assembly is a prism structure with a vertex angle between 60 and 90 degrees.

As the diffusion plate of the invention has the first curve and second curve formed with the patterns that protrude in the opposite directions, light passing through the first curve and light passing through the second curve diffuse in different fashions. Hence, luminous distribution on the display surface is more desirable. For a LCD equipped with the diffusion plate of the invention, the display quality also improves.

The foregoing, as well as additional objects, features and advantages of the invention, will be more readily apparent from the following detailed description, which proceeds with reference to the accompanying drawings.

DESCRIPTION OF THE PREFERRED EMBODIMENTS

Figure 1:
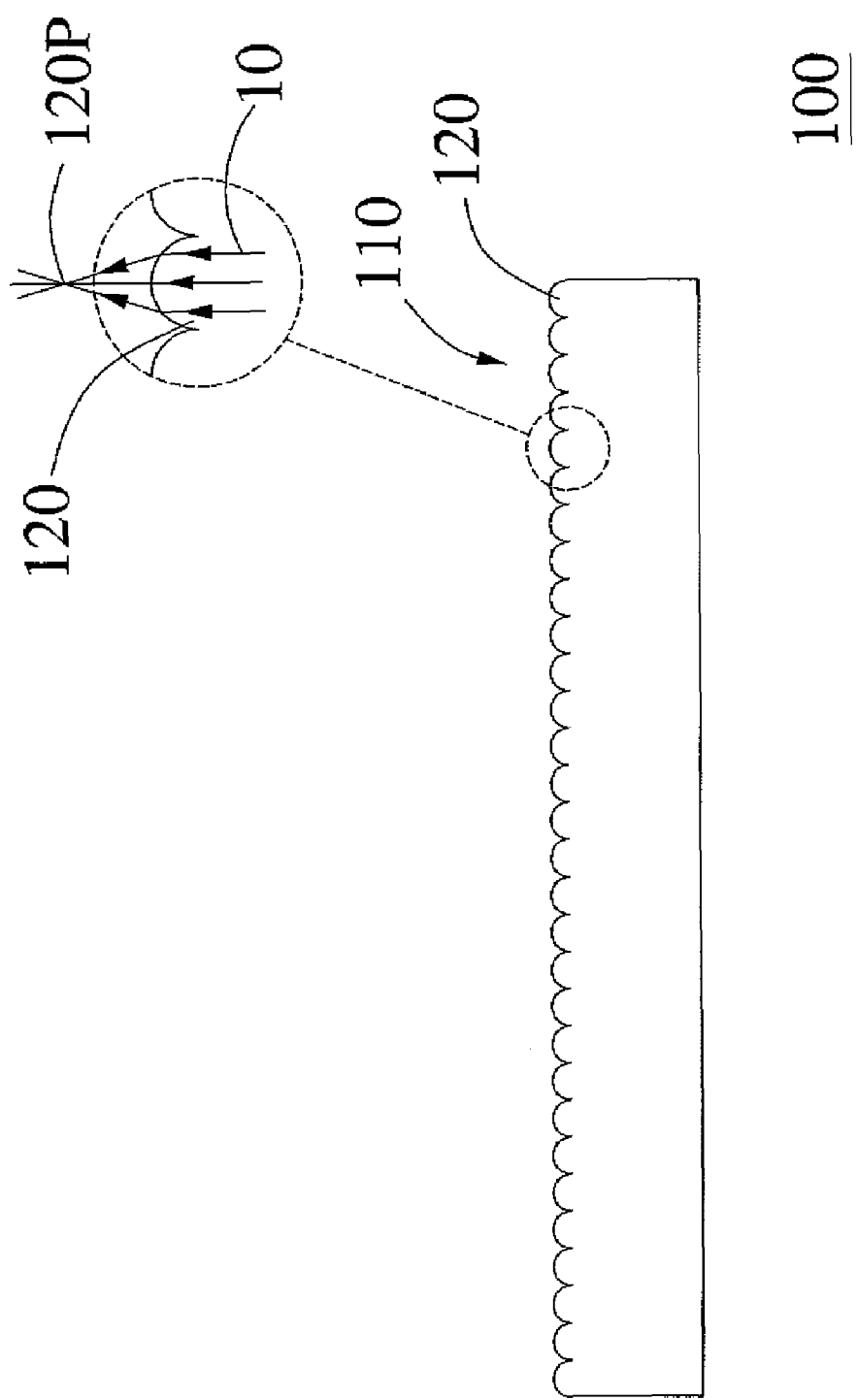
FIG. 1 is a schematic view of a conventional diffusion plate with patterns formed on the emission surface.
Figure 2A:
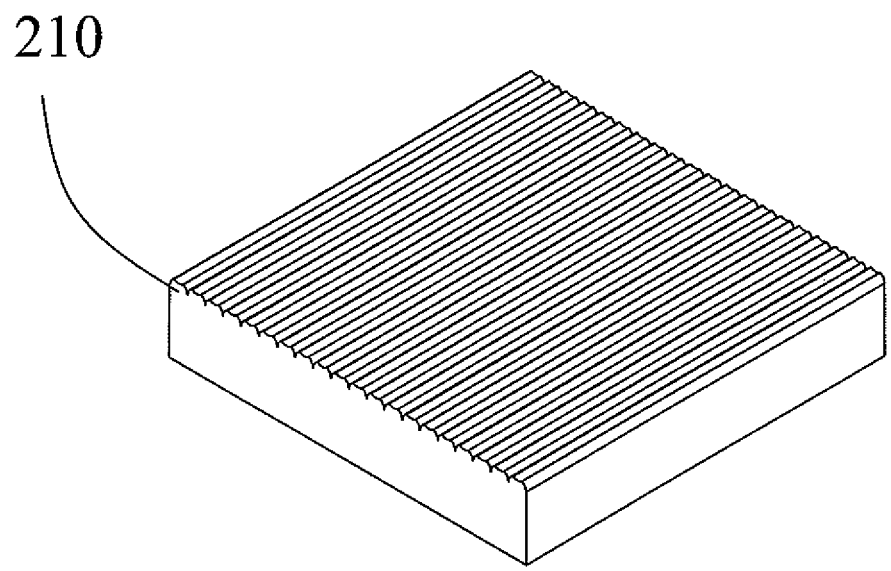
FIG. 2A is a perspective view of a first embodiment of the diffusion plate of the invention.
Figure 2B:
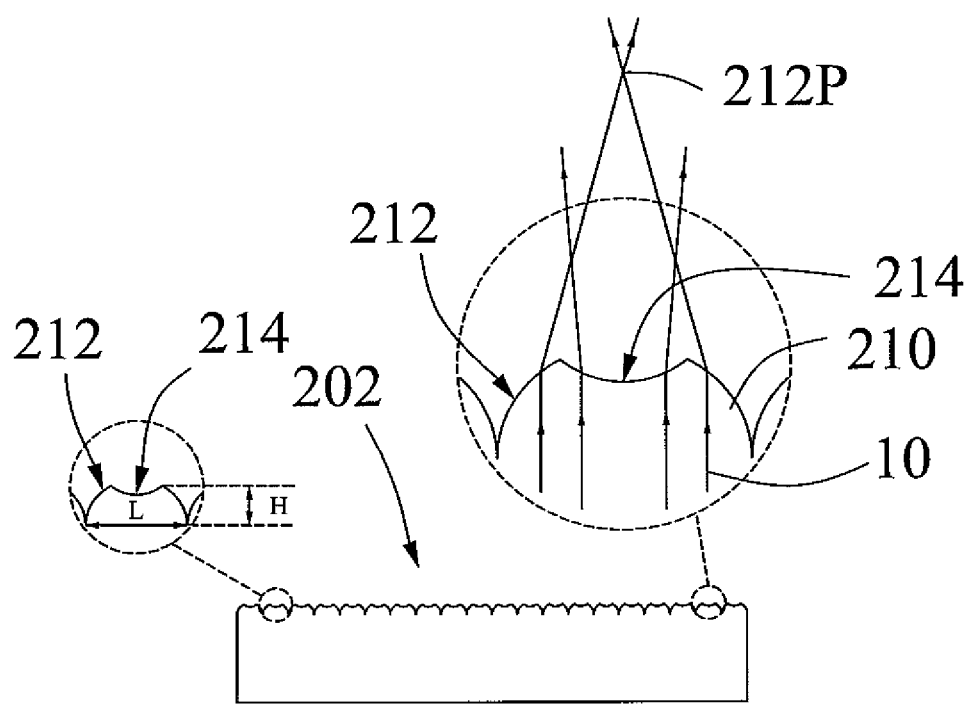
FIG. 2B is a side view of the first embodiment of the diffusion plate of the invention.

Please refer to FIGS. 2A and 2B for a first embodiment of the diffusion plate of the invention. The diffusion plate 200 has an emission surface 202 which has a plurality of bar-type patterns 210 formed thereon. The patterns 210 are a protruding structure directing outwards. The patterns 210 have a vertical length H less than ½ of the width L. The patterns 210 consist of a first curve 212 and a second curve 214 that protrude in opposite directions. Namely, the first curve 212 protrudes in an outward direction, while the second curve 214 is indented inwards. In this embodiment, the second curve 214 is an arc formed at a radius curvature between 0.05 mm and 0.3 mm.

The diffusion plate 200 is made from transparent material, such as polymers, preferably having a penetration rate greater than 75%. The material for the diffusion plate 200 may be selected from the group consisting of Polymethyl Methacrylate (PMMA), Polycarbonate (PC), Polystyrene (PS), Methyl Methacrylate Styrene (MS), Polypropene (PP), Polythylene (PE) and Polythylene terephthalate (PET).

Figure 3:
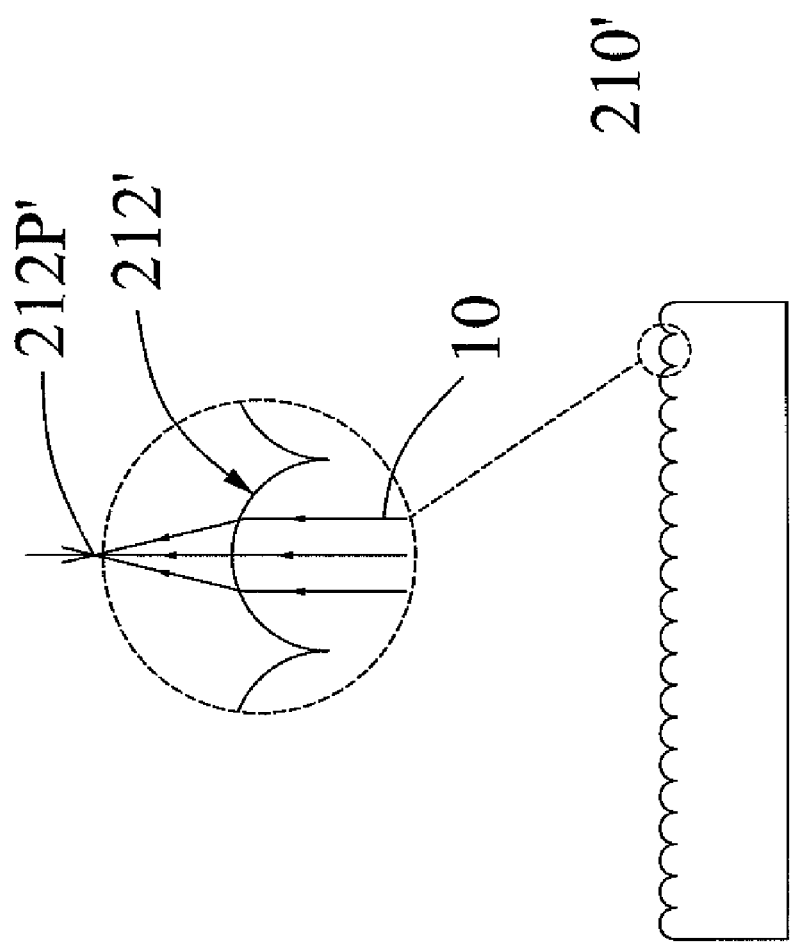
FIG. 3 is a schematic view of another diffusion plate for comparing with the first embodiment.

Referring to FIG. 2B, when light 10 passes through the first curve 212, it substantially converges at a focal point 212P and, then, diffuses. However, the light 10 passing through the second curve 214 directly diffuses outwards. Hence, the light 10 passing through the patterns 210 diffuses in two different fashions. Refer to FIG. 3 for a comparison with the first embodiment. Another diffusion plate 200' also has patterns 210', but they have only a first curve 212' protruding outward without the indented second curve 214. Hence, when the light 10 passes though the patterns 210', it substantially converges inwards at a focal point 212P', then diffuses.

Comparing FIG. 2B with FIG. 3, when the light 10 passes through the patterns 210, two different types of diffusion take place, and a more desirable diffusion effect is generated. Hence, it is less likely to generate bright and dark strips on the display surface. As a result, the LCD equipped with the diffusion plate 200 has an improved display quality.

Figure 4A:
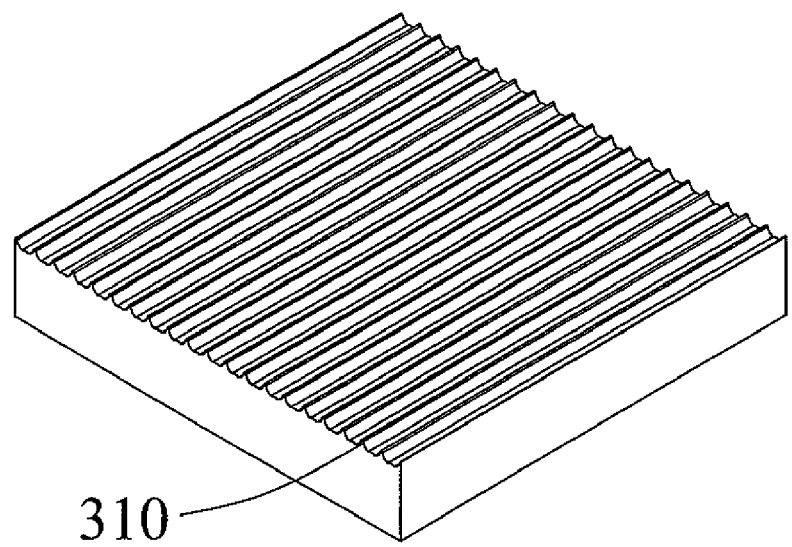
FIG. 4A is a perspective view of a second embodiment of the diffusion plate of the invention.
Figure 4B:
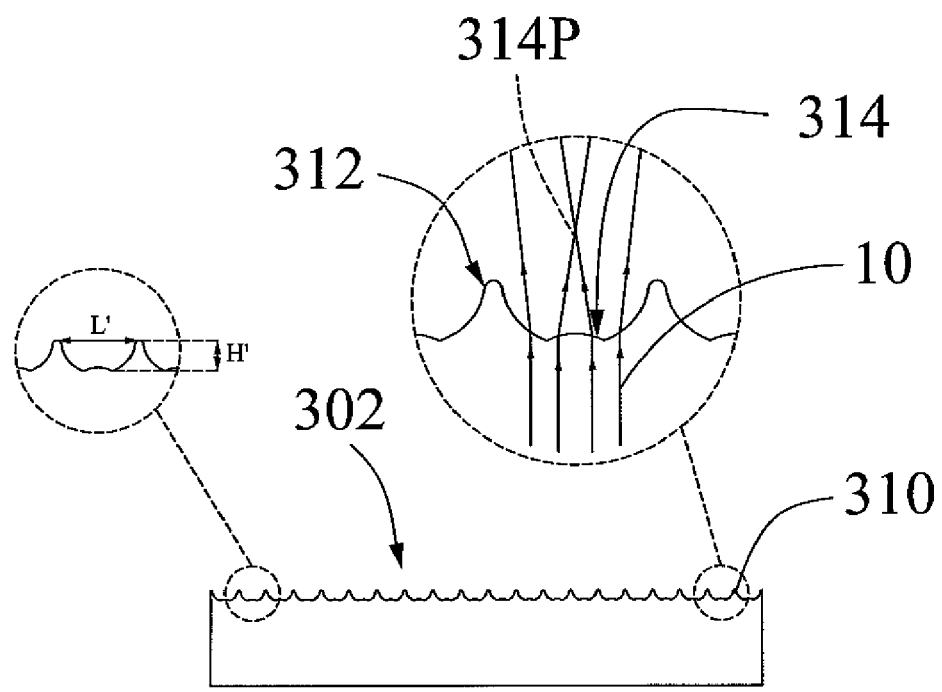
FIG. 4B is a side view of the second embodiment of the diffusion plate of the invention.

Refer to FIGS. 4A and 4B for a second embodiment of the diffusion plate of the invention. A diffusion plate 300 has an emission surface 302 with a plurality of bar-type patterns 310 formed thereon. The patterns 310 are concaves indented inwards and have a vertical length H' less than ½ of the width L'. In the embodiment, the ratio of the vertical length and width is 1:2.4. The patterns 310 consist of a first curve 312 and a second curve 314 that protrude in opposite directions. Namely, the first curve 312 is indented inwards, while the second curve 314 protrudes outwards. In this embodiment, the second curve 314 is an arc formed at a radius curvature between 0.05 mm and 0.3 mm.

Figure 5:
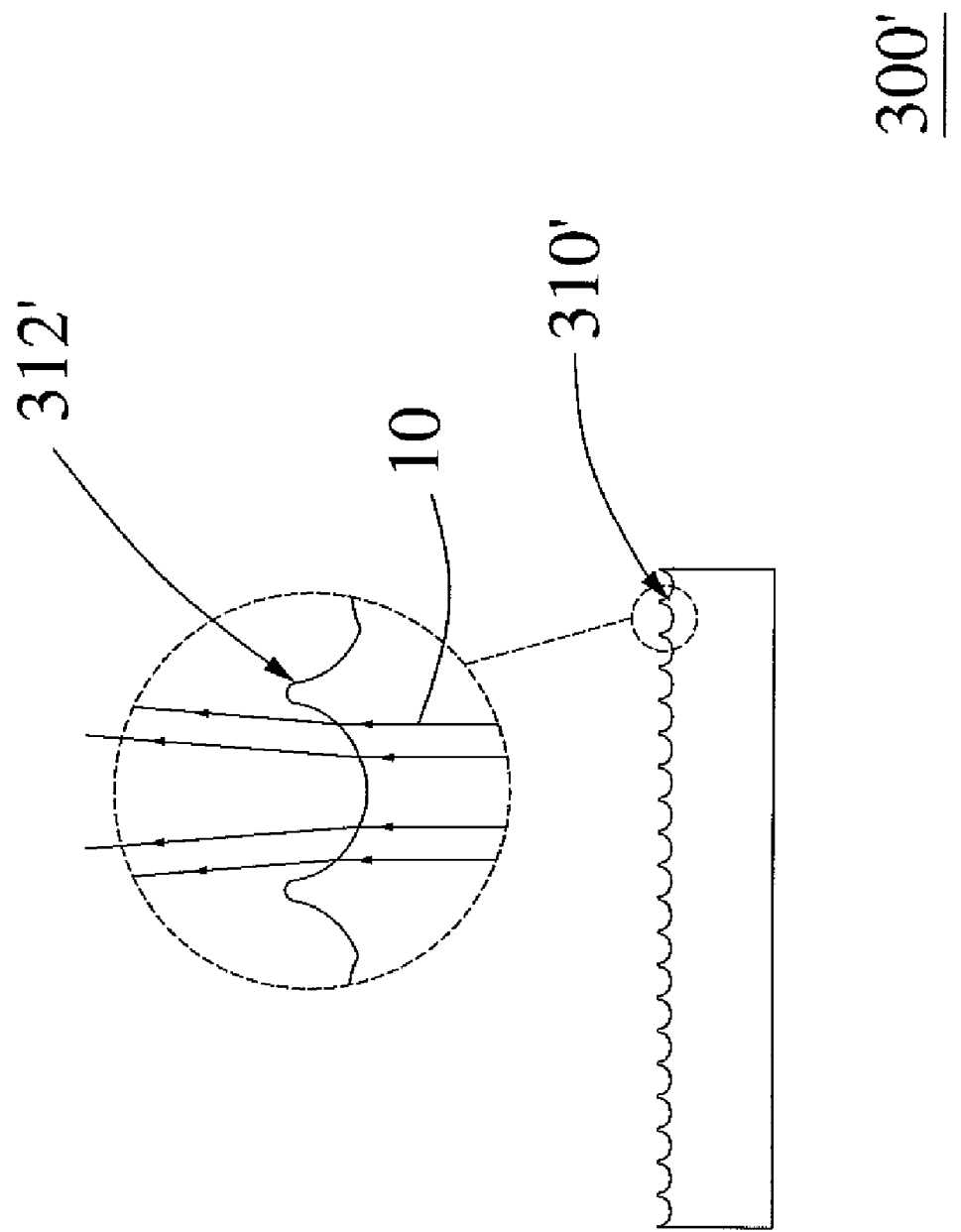
FIG. 5 is a schematic view of yet another diffusion plate for comparing with the second embodiment.

Also referring to FIG. 4B, when the light 10 passes through the first curve 312, it diffuses outwards. However, the light 10 passing through the second curved 314 converges at a focal point 314P and, then, diffuses. Thus, two types of diffusion take place when the light 10 passes through the patterns 310. Refer to FIG. 5 for comparing with the second embodiment. Yet another diffusion plate 300' also has patterns 310'. However, they differ from the patterns 310 by having only a first curve 312' that is indented inwards without the second curve 314 that protrudes outwards. Hence, the light 10 passing through the patterns 310' diffuses outwards.

Comparing FIG. 4B with FIG. 5, after the light 10 has passed though the pattern 310, two types of diffusion take places and a more desirable diffusion effect can be achieved. Thus, a LCD equipped with the diffusion plate 300 has an improved display quality.

Figure 6:
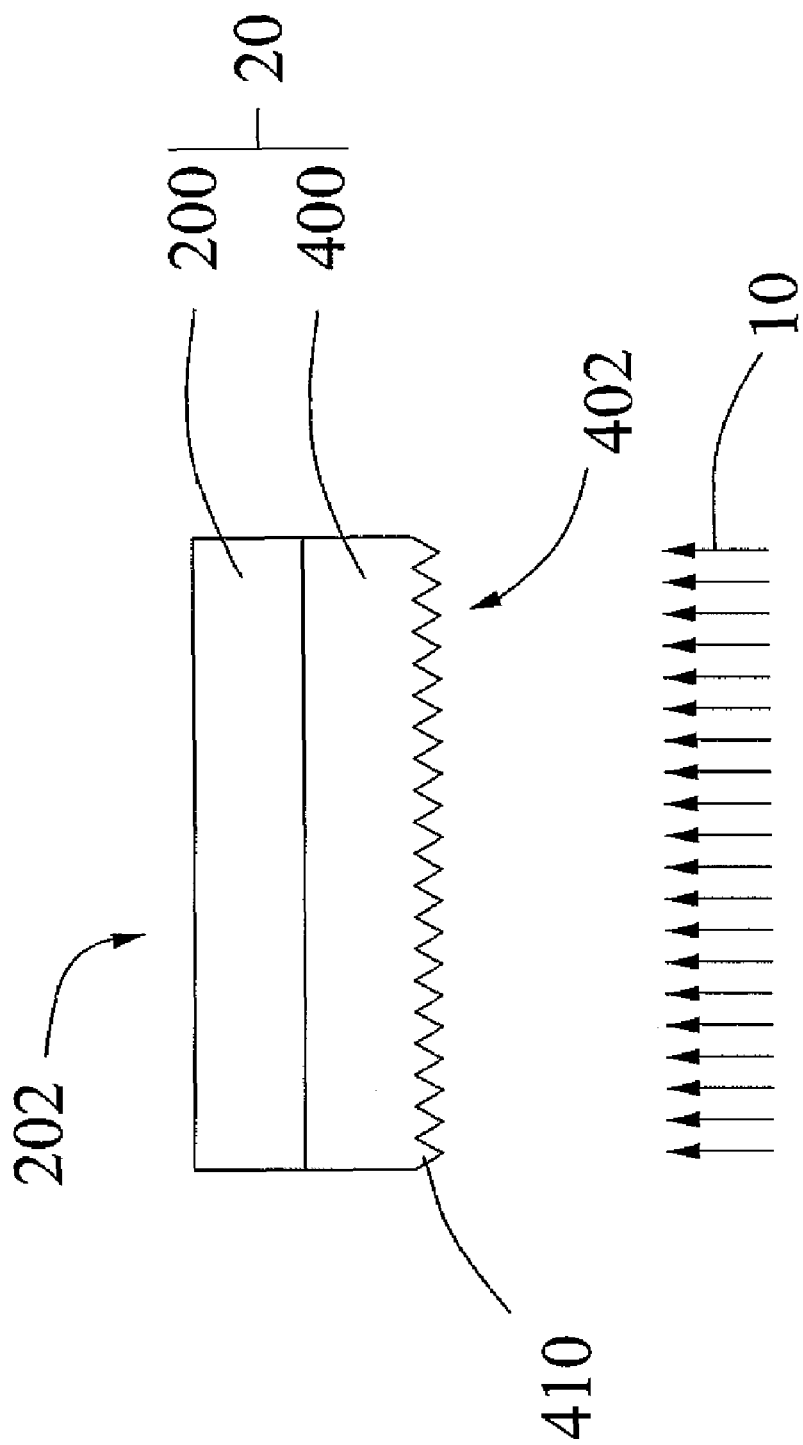
FIG. 6 is a schematic view of a diffusion plate assembly.

In practice, the diffusion plates depicted in the first and second embodiments can be in coupled with other diffusion plates. For instance, the diffusion plate 200 can be coupled with a second diffusion plate 400 to form a diffusion plate assembly 20 (referring to FIG. 6). The second diffusion plate 400 is located beneath the diffusion plate 200. As the diffusion plate 200 has been discussed previously, it is omitted herein. The second diffusion plate 400 has a light incident surface 402 which has a plurality of second patterns 410 formed thereon. The second patterns 410 are a prism structure with a vertex angle between 60 and 90 degrees. In this embodiment, the second patterns 410 are formed to cross the patterns 210 at a normal angle. Namely, the second patterns 410 are laid 90 degrees from the patterns 210. As the second patterns 410 can alter the light travel path, the total diffusion effect of the diffusion plate assembly 20 improves even more. Of course, to those skilled in the art, the second patterns 410 can also be formed in other shapes, such as semi-spherical or the like. In addition, the second patterns 410 may also be parallel with the patterns 210, or differ at other angles.

The diffusion plate assembly 20 previously discussed has been tested through optical simulations. The diffusion plate assembly 20 is projected by one set of lights 10. The second curve 214 of the diffusion plate 200 has a radius curvature of 0.1 mm. The uniformity obtained is 1.03. The uniformity is the brightness ratio of the most brightness spot and the most dark spot on the emission surface 202.

Next, the diffusion plate 200 in the diffusion plate assembly 20 is replaced by another the diffusion plate 300 shown in FIG. 4B, with the radius curvature of the second curve 314 of the diffusion plate 300 set at 0.1 mm. Then, the optical simulation is executed again. The resulting uniformity is 1.01.

Next, the diffusion plate 200 of the diffusion plate assembly 20 is replaced by another diffusion plate 200' shown in FIG. 3. Then, the optical simulation is done again. The resulting uniformity is 1.1.

The optical simulation results indicate that the diffusion plate of the invention can achieve an improved uniformity. For a LCD equipped with the diffusion plate of the invention, its display quality improves.

Figure 7A:
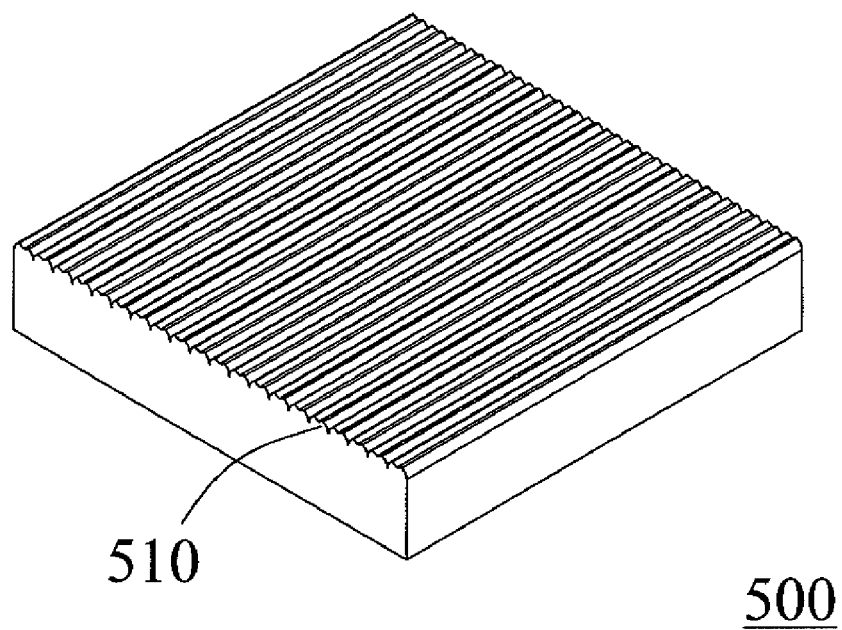
FIG. 7A is a perspective view of a third embodiment of the diffusion plate of the invention.
Figure 7B:
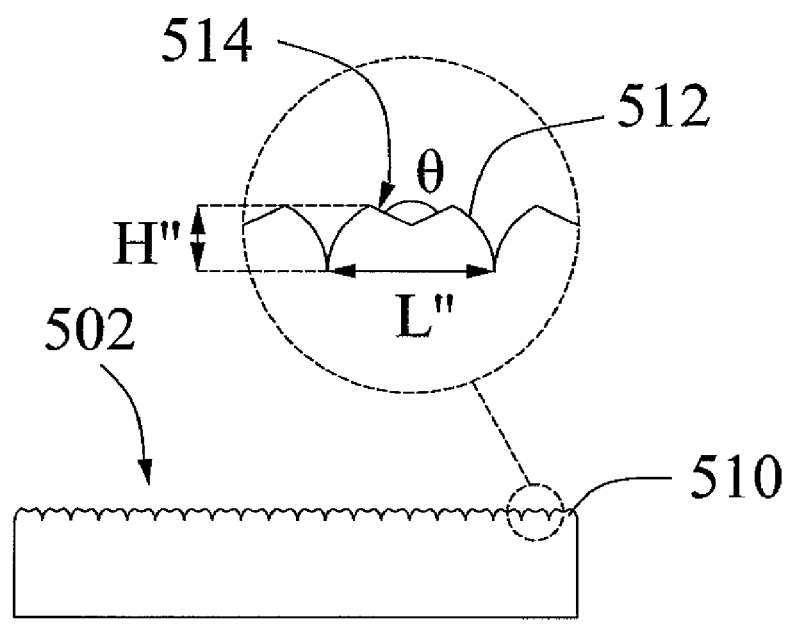
FIG. 7B is a side view of the third embodiment of the diffusion plate of the invention.

Of course, to those skilled in the art, the second curve 314 may be changed to other shapes besides a curve. The following shows another embodiment. Refer to FIGS. 7A and 7B for a third embodiment of the diffusion plate of the invention. The diffusion plate 500 is made from polymers and has an emission surface 502 with a plurality of bar-type patterns 510 formed thereon. The patterns 510 have a first curve 512 and a triangle 514 protruding in opposite directions. Namely, the vertex angle θ of the triangle 514 is between 90 and 120 degrees. The patterns 510 have a vertical length H' less than ½ of the width L'. Although the patterns 510 in the third embodiment protrude outwards, to those skilled in the art, they also can be formed by indenting inwards.

In the embodiments previously discussed, the patterns are formed at the same size. However, to those skilled in the art, they also can be formed in different sizes and laid in a staggered fashion.

Moreover, in the embodiments set forth above, the patterns of the diffusion plate are adjacent to one another. To those skilled in the art, they also may be spaced from one another at a selected distance. In the foregoing embodiments, while the vertical length H is less than ½ of the width, in practice, the vertical length H may also be greater than or equal to ½ of the width L.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. A diffusion plate made from a transparent material comprising an emission surface which has a plurality of bar-type patterns formed thereon, with a cross section of each of the patterns including a first curve having a first width and a second curve located within the first width of the first curve and having a second width less than the first width of the first curve, wherein the first curve is concave indented inwards and the second curve is convex protruded outwards.

2. The diffusion plate of claim 1, wherein the first curve is formed at a vertical length less than one half of the first width thereof.

3. The diffusion plate of claim 2, wherein the vertical length and the first width of the first curve of the patterns are at a ratio of 1:2.4.

4. The diffusion plate of claim 1, wherein the diffusion plate is made from materials selected from the group consisting of Polymethyl Methacrylate (PMMA), Polycarbonate (PC), Polystyrene (PS), Methyl Methacrylate Styrene (MS), Polypropene (PP), Polythylene (PE) and Polythylene terephthalate (PET).

5. The diffusion plate of claim 1 wherein the second curve has an arc formed at a radius curvature ranged from 0.05 mm to 0.3 mm.

6. The diffusion plate of claim 5, wherein the second curve has a radius curvature of 0.1 mm.

7. A diffusion plate assembly comprising a first diffusion plate and a second diffusion plate, the first diffusion plate being located above the second diffusion plate and having an emission surface which has a plurality of bar-type first patterns formed thereon, the first patterns including a first curve having a first width and a second curve located within the first width of the first curve and having a second width less than the first width of the first curve, wherein the first curve is concave indented inwards and the second curve is convex protruded outwards, the second curve being an arc formed at a radius curvature between 0.05 mm and 0.3 mm, the second diffusion plate having a light incident surface which has a plurality of second patterns formed thereon.

8. The diffusion plate assembly of claim 7, wherein the first curve is formed at a vertical length less than one half of the first width thereof.

9. The diffusion plate assembly of claim 8, wherein the vertical length and the width of the first curve of the first patterns are at a ratio of 1:2.4.

10. The diffusion plate assembly of claim 7, wherein the diffusion plates are made from materials selected from the group consisting of Polymethyl Methacrylate (PMMA), Polycarbonate (PC), Polystyrene (PS), Methyl Methacrylate Styrene (MS), Polypropene (PP), Polythylene (PE) and Polythylene terephthalate (PET).

11. The diffusion plate of claim 7, wherein the second curve has a radius curvature of 0.1 mm.

12. The diffusion plate assembly of claim 7, wherein the second patterns are a prism structure.

13. The diffusion plate assembly of claim 12, wherein the prism structure has a vertex angle ranged from 60 degrees to 90 degrees.

14. The diffusion plate assembly of claim 7, wherein the first patterns cross the second patterns at a normal angle.

* * * * *